United States Patent
Lindner

(10) Patent No.: US 10,983,067 B2
(45) Date of Patent: Apr. 20, 2021

(54) DEVICE AND METHOD FOR OPTICAL MONITORING OF SURFACES OF AN OBJECT

(71) Applicant: Inlevel GmbH, Aachen (DE)

(72) Inventor: Bjoern Lindner, Aachen (DE)

(73) Assignee: Inlevel GmbH, Aachen (DE)

( * ) Notice: Subject to any disclaimer, the term of this patent is extended or adjusted under 35 U.S.C. 154(b) by 195 days.

(21) Appl. No.: 16/033,630

(22) Filed: Jul. 12, 2018

(65) Prior Publication Data
US 2019/0107497 A1    Apr. 11, 2019

(30) Foreign Application Priority Data
Jul. 12, 2017    (DE) .......................... 102017006566.7

(51) Int. Cl.
*G01N 21/94*    (2006.01)
*G06T 7/11*    (2017.01)
*G01B 11/30*    (2006.01)
*G01N 21/93*    (2006.01)
*G06T 7/00*    (2017.01)
(Continued)

(52) U.S. Cl.
CPC .......... *G01N 21/94* (2013.01); *G01B 11/306* (2013.01); *G01N 21/89* (2013.01); *G01N 21/93* (2013.01); *G06T 7/001* (2013.01); *G06T 7/11* (2017.01); *G01N 2021/8887* (2013.01); *G01N 2021/8909* (2013.01); *G01N 2021/945* (2013.01)

(58) Field of Classification Search
CPC combination set(s) only.
See application file for complete search history.

(56) References Cited

U.S. PATENT DOCUMENTS 4,692,026 A * 9/1987 Gawrisch .......... G01B 11/0691
356/492
5,132,791 A * 7/1992 Wertz .................... B65H 43/04
250/559.46
(Continued)

FOREIGN PATENT DOCUMENTS

DE            10011200 A1    9/2001
DE        102008028869 A1    12/2009
(Continued)

*Primary Examiner* — Tsung Yin Tsai
(74) *Attorney, Agent, or Firm* — Muncy, Geissler Olds & Lowe, P.C.

(57) ABSTRACT

A method for monitoring a surface of an object via at least one optical camera including the steps: (i) image capture of a predetermined surface segment of the object by a camera at a first point in time, (ii) inspection of the predetermined surface segment of the object such that the surface of the object is acted on, and (iii) image capture of the predetermined surface segment of the object by a camera at a second point in time, which takes place after the first point in time, wherein the image data of the predetermined surface segment of the images of step (i) and step (iii) is sent to an evaluation means and then evaluated by this evaluation means and compared to each other, wherein, if a surface flaw detected in the image capture of step (iii), both in terms of its shape or its position on the surface of the object, coincides with a surface flaw detected in the image capture of step (i), then this surface flaw is classified as an actual surface flaw of the object.

11 Claims, 3 Drawing Sheets

(51) Int. Cl.
*G01N 21/89* (2006.01)
*G01N 21/88* (2006.01)

(56) References Cited

U.S. PATENT DOCUMENTS

| | | | | |
|---|---|---|---|---|
| 5,591,985 | A * | 1/1997 | Tsuji | G01N 21/94 250/559.41 |
| 5,960,104 | A * | 9/1999 | Conners | G01N 21/8986 144/402 |
| 6,313,913 | B1 * | 11/2001 | Nakagawa | G01N 21/94 250/225 |
| 6,941,009 | B2 | 9/2005 | Wienecke | |
| 2006/0119864 | A1 * | 6/2006 | Lindner | G01N 21/952 356/606 |
| 2009/0316981 | A1 | 12/2009 | Brueck et al. | |
| 2012/0218437 | A1 * | 8/2012 | Hermary | G01B 11/245 348/222.1 |
| 2013/0015354 | A1 * | 1/2013 | Diamond | G01N 21/4795 250/339.07 |
| 2014/0218504 | A1 * | 8/2014 | Couturier | G01N 21/8901 348/93 |
| 2016/0153917 | A1 * | 6/2016 | Couturier | G01N 21/8986 356/445 |

FOREIGN PATENT DOCUMENTS

| | | | |
|---|---|---|---|
| DE | 102013109915 | A1 | 3/2015 |
| DE | 102014016135 | A1 | 5/2016 |
| DE | 102015101027 | A1 | 7/2016 |

\* cited by examiner

DEVICE AND METHOD FOR OPTICAL MONITORING OF SURFACES OF AN OBJECT

This nonprovisional application claims priority under 35 U.S.C. § 119(a) to German Patent Application No. 10 2017 006 566.7, which was filed in Germany on Jul. 12, 2017, and which is herein incorporated by reference.

BACKGROUND OF THE INVENTION

Field of the Invention

The invention relates to a method for monitoring the surface of an object by means of at least one optical camera, and a corresponding device for monitoring the surface of an object.

Description of the Background Art

According to the state of the art, industrial image processing systems, which consist of digital cameras, lighting and evaluation means (computer with software), are known for inspecting the quality of surfaces of an object. Such image processing systems are used on an industrial scale particularly for monitoring the surfaces and the dimensional accuracy of manufactured products.

In many production processes, liquids (e.g., water) are used as aids (e.g., for cooling). In this context, there regularly is a risk or a source of problems in that in the optical inspection of the products produced by an image processing system, residues of such liquids are still located on the product surface in the production line. These liquids, especially if they occur sporadically in the form of drops, visually appear to be an actual surface flaw (e.g., in the form of a bubble) and are then regularly classified as surface flaws by the image processing system. As a result, the product produced is classified as flawed, though it is actually in order, and is marked and disposed of. This has the disadvantage that the reject rate of manufactured products which are actually in order unnecessarily increases above a tolerable level.

SUMMARY OF THE INVENTION

In view of the above problem, attempts have been made in conjunction with classical image processing algorithms to distinguish between actual surface flaws and, e.g., temporary drops of liquid in the real-time camera images. Such experiments in which, among other things, neural networks are used, often do not lead to the desired success, since the two object classes, i.e., on the one hand, the actual surface flaws and on the other hand, temporary drops of liquid or dirt particles, are too similar. This problem occurs in particular in plastics and rubber extrusion where water is used for cooling the extrudate. In the same way, there is often a deposition of flake-like contaminants on the manufactured products due to material abrasion or other additives in the manufacturing process which can trigger incorrect detection of supposed surface flaws or of pseudo defects. Correspondingly, the object of the invention is to optimize the optical monitoring of object surfaces and in particular, to ensure reliable automated distinction between on the one hand, actual surface flaws, and on the other hand, temporary drops of water, dirt or the like.

The above object is achieved by a method having the features of claim 1, and by a device having the features of claim 13 and claim 14. Advantageous developments of the invention are the subject of dependent claims.

The present invention provides a method which serves to monitor the surface of an object by means of at least one optical camera. This method comprises the steps of: (i) an image of a predetermined surface segment of the object captured by a camera at a first point in time, (ii) the inspection of the predetermined surface segment of the object in such a way that the surface of the object is acted on, and (iii) an image of the predetermined surface segment of the object captured by a camera at a second point in time, which takes place after the first point in time. In this case, the image data of the predetermined surface segment from the images captured in step (i) and step (iii) are sent to an evaluation means and then evaluated by this evaluation means and compared with one another. If a surface flaw detected in the image from step (iii) matches a surface flaw detected in the image captured in step (i), this surface flaw is classified as an actual surface flaw of the object, both with respect to its shape as well as to the position of the defect on the surface of the object.

Similarly, the present invention also provides a device for monitoring the surface of an object which can be moved relative to the device. Such a device comprises an optical camera with which at least a first line and a second line can be read on the surface of the object. Alternatively, the device can comprise a first optical line scan camera and a second optical line scan camera, wherein at least a first line can be read with the first line scan camera, and at least a second line can be read with the second line scan camera on the surface of the object. In both of these variants, the first and second lines are spatially separated from each other and in particular run parallel to each other, wherein the optical camera (or the first and second optical line scan cameras) captures an image of a predetermined surface segment of the object at different times, such that at a first time, the predetermined surface segment is located in the area of the first line, and at a second time, in the area of the second line. The device further comprises a surface inspection means which can act on the surface of the object in a section between the first line and the second line such that thereby particles (e.g., flake-like dirt, dust or the like) and/or drops of liquid on the surface of the object are variable in their shape and/or position. Finally, the device comprises an evaluation means signally connected with the optical camera (or with the optical line scan cameras), with which the image data of the camera(s) of the first and second lines are evaluated on the surface of the object and compared with each other. If a surface flaw detected in the area of the first line coincides, in terms of both its shape and its position on the object surface, with a surface flaw detected in the area of the second line, then this surface flaw is classified as an actual surface flaw of the object.

The invention is based on the essential knowledge that in the quality control of an object, at least one camera captures an image of a predetermined surface segment of the object at different times or offset in time, wherein in the course of an evaluation of the images of this surface segment and a subsequent comparison, actual surface flaws that exist on the examined surface of the object are confirmed as such and are classified accordingly. Conversely, this means that by evaluating the captured images of the predetermined surface segment which are created at the first and second points in time, or in the area of the first and second lines, and by subsequently comparing this evaluation or these images, an automated differentiation between actual surface flaws and temporary surface flaws or so-called pseudo defects (defect due to liquid or impurities) is reliably created, in which case the pseudo defects are filtered out of the signal process and are no longer taken into account.

According to the invention, the detection of such pseudo defects is based on the fact that the surface of the object in the predetermined surface segment is acted on, such that the shape and/or position of particles and/or drops of liquid on the surface of the object in said surface segment are changed. For such an effect on the surface of the object, either a blower can be used to apply a fluid to the surface of the object, preferably under pressure, or alternatively, an element touching the surface of the object, preferably in the form of a brush, is used to act on the surface of the object. The blower can preferably be operated with air, or with other gases. In any case, such an effect on the predetermined surface segment of the object always takes place between the images captured at the first point in time (according to step i) and at the second point in time (according to step iii) or between the first line and the second line. This ensures that so-called pseudo defects, e.g., in the form of drops of water or flake-like contamination, which can temporarily be deposited in the predetermined surface segment on the surface of the object, change their shape and/or position between the two images captured so that then, a distinction between these pseudo defects and actual surface flaws, which do not change in terms of shape or position despite being acted on, is ensured. As a result, false classification or false marking of an object or a product, on which quality inspection of the surface is performed, is avoided. In concrete cases, it can be avoided, for example, that an object which is actually free of defects is rejected as waste if on its surface, namely in the predetermined surface segment which is captured or read by the at least one camera, a drop of water or similar contamination is temporarily deposited.

At this point, it is separately noted that the images of the same predetermined surface segment of the object captured by the camera, which are created at the first point in time and at the second point in time, are evaluated by the evaluation means in real time and then compared with each other. In this regard, it is understood that between these two camera images, i.e., between the first point in time and the second point in time, the predetermined surface segment of the object is acted on as explained above, such that particles and/or liquid drops in the predetermined surface segment of the object are changed in terms of their shape and/or position. A surface flaw that is initially detected in an image at the first point in time, and which is still present on the object surface in the same position and in the same shape in the image at the second point in time, can thus be classified as an actual surface flaw. However, if a surface flaw from the camera image at the first point in time differs in shape and/or position from the image at the second point in time, then it is a so-called pseudo defect (e.g., defect due to liquid or impurities), which is filtered out of the signal process and is no longer taken into account.

In an advantageous development of the invention, a relative movement between the object and the at least one camera takes place between the images captured according to steps (i) and (iii). Conveniently, the object is moved relative to the camera, wherein the object is preferably translationally displaced relative to the camera. Such a movement of the object past the camera is particularly suitable for the production of continuous profiles, but it is also applicable in the production of isolated objects or products.

By moving the object past the camera or the device according to the invention, it is ensured that the surface of the object is completely captured or inspected. In this context, it is also possible to aim a plurality of cameras at one area of the object, so that in this area the object is inspected from multiple sides (e.g., top and bottom, possibly also lateral areas thereof). As an alternative to moving the object past the camera or the inventive device, it is also possible to move the camera(s) or the inventive device past a stationary object. In the same way as explained above, images of the predetermined surface segment of the object are captured at different points in time, wherein these images are then evaluated by the evaluation means and compared with each other.

For the present invention, it is also possible that the camera or the device, on the one hand, and the object on the other hand, are not moved relative to each other. In this case, the first line and the second line then coincide on the surface of the object, or are identical. In any case, it is important here that the surface segment of the object, which is read with the optical camera, is acted on between the images at the first point in time and those at the second point in time, as explained above, in such a way that particles and/or drops of liquid in this predetermined surface segment on the surface of the object are changed in their shape and/or position. After this inspection of the predetermined surface segment of the object, a new image of the predetermined surface segment of the object can be captured, in accordance with step (iii).

In an advantageous development of the invention, if a relative movement between the object and the at least one camera is present, different spatially spaced lines or rows are read on the surface of the object at the first point in time and at the second point in time, i.e., when the images of steps (i) and (iii) are captured, wherein these lines in particular run parallel to each other. In this regard, it is understood that the read-out lines are stationary, in coordination with the optics or the position of the camera, in which case—as explained—the object preferably moves past the camera. Between these lines, which are read by the camera, and thus between the first point in time and the second point in time, the inspection of the predetermined surface segment of the object is carried out according to step (ii), wherein as explained, the surface of the object is acted on, thereby changing the shape and/or position of particles and/or liquid drops in the predetermined surface segment on the surface of the object.

In an advantageous further development of the invention, in a classification of an actual surface flaw, the surface of the object is suitably marked at the spot where this surface flaw is actually located. For this purpose, the device according to the invention may comprise a corresponding marking device. In this context, it can also be provided that the object is cut or separated at the marked location so that a segment of the object in which an actual surface flaw is detected or classified is separated out of the object. This is an advantage especially in the output of continuous profiles.

In an advantageous development of the invention, if a surface flaw detected in the image captured in step (iii) deviates in terms of shape from a surface flaw detected in the image captured in step (i) in such a way that the respective lengths or layers of the half-axes of an ellipse enveloping said surface flaw have changed by at least 10%, preferably by 20%, more preferably by at least 30%, then this surface flaw can be detected/categorized as a pseudo defect (defect due to liquid or impurities) and filtered out of the signal process.

In an advantageous development of the invention, if a surface flaw detected in the image captured in step (iii) deviates in terms of its position on the object surface from a surface flaw detected in the image captured in step (i) in such a way that the focal point of the surface flaw is displaced by at least 10%, preferably by 20%, more preferably by at least 30% of the averaged extent of this surface flaw on the surface of the object, then this surface flaw can be detected/categorized as a pseudo defect (defect due to liquid or impurities) and filtered out of the signal process.

In an advantageous embodiment of the invention, a first list of candidates for possible surface flaws can be generated [sic—by?] the evaluation means with the images of step (i) and on the basis of a comparison of the surface of the object with no defects [sic—German sentence very awkward], wherein the evaluation means generates a second list of candidates for possible surface flaws with the images of step (iii) and on the basis of a comparison of the surface of the object with no defects, wherein the evaluation means then converts the candidates for possible surface flaws according to the first and second list in a common coordinate system with respect to the object, and compares said candidates therein, wherein a surface flaw of the second list (step iii), which has a deviation by at least 10%, preferably by at least 20%, more preferably by at least 30% when compared to a corresponding surface flaw of the first list (step i) in terms of its shape and/or its position on the surface of the object, is detected as a pseudo defect (defect due to liquid or impurities) and is filtered out of the signal process.

In an advantageous development of the invention, the camera, with which the predetermined surface segment of the object is read at the first point in time and at the second point in time, may be an optical area scan camera, in particular a CMOS area scan camera. If the object is moved past the camera, the use of a flash is required for the creation of images in order to keep the shutter speed or exposure time low and to avoid a "smearing" of the captured image due to the movement of the object.

According to an expedient embodiment, the camera can be designed as a so-called hybrid area scan camera. For the purposes of the present invention, this is a CMOS matrix camera which allows for the targeted, fast reading of individual lines or image sections from a captured image. By reading individual selected lines, such a hybrid area scan camera thus imitates the operation of a line scan camera. By using such a hybrid area scan camera, there is the advantage that only a single camera is required for capturing the predetermined surface segment of the object in the area of the first line and the second line, i.e., when the object moves past the camera at the first point in time and at the second point in time, with which the two spatially spaced lines (first line and second line) are read. Spatially between these lines, the predetermined surface segment of the object is inspected and its surface is acted on, for example, by using a blower or an element (e.g., a brush) based on [sic—should this be "berührenden"=[touching]?] the surface of the object.

According to an alternative embodiment of the invention, it can be provided that in each case separate optical line scan cameras are used, wherein on the surface of the object, at least a first line can be read by a first line scan camera and at least a second line can be read by a second line camera. In each case, these optical line scan cameras only capture one image line in the predetermined surface segment on the surface of the object, but at a very high speed so that "smearing" of the produced image is avoided.

If the at least one optical camera functions in the manner of a line scan camera, the use of a flash is not required to monitor the surface of an object, provided sufficient daylight or room light is available. Expressed differently, the operation of the at least one camera in the manner of a line scan camera can omit the use of a flash without causing "smearing" of the image captured. This is especially true in the event that the camera is designed as a so-called hybrid area scan camera, as described above.

In an advantageous embodiment of the invention, the optics of a camera can be aligned obliquely at an angle with respect to an orthogonal directed towards the surface of the object. In such an inclined or oblique alignment of the camera, its optics is preferably designed such that it fulfills the Scheimpflug condition.

Below, various embodiments of the invention are described in detail using a schematically simplified drawing.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
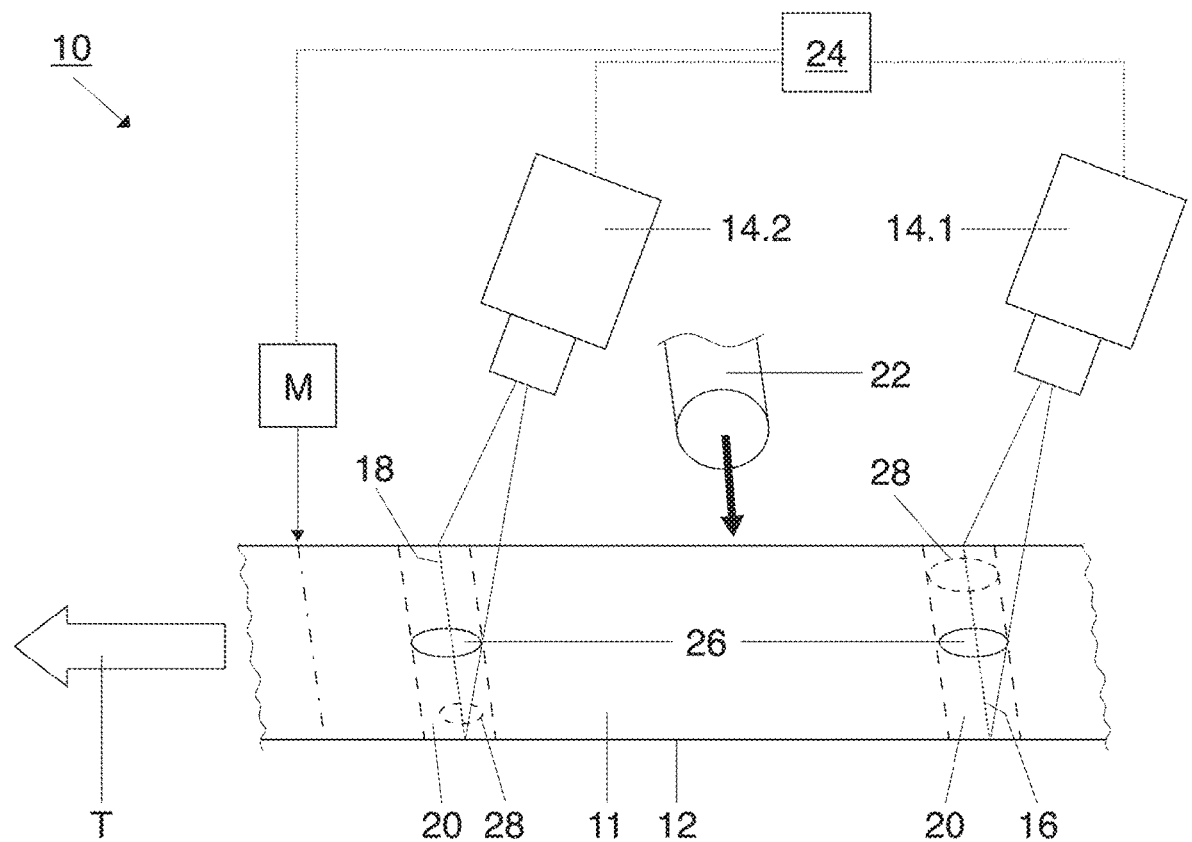
FIG. 1 is a perspective view of a device according to the invention, according to a first embodiment.

Hereinafter, with reference to FIGS. 1 and 2, preferred embodiments of a device 10 according to the invention with which the surface of an object is optically monitored are illustrated and explained. Same features in the drawing are each provided with the same reference numerals. Here, it is separately noted that the drawing is shown simplified and in particular not true to scale.

The device 10 serves to monitor the surface 11 of an object 12, thereby enabling the detection/classification of actual surface flaws and at the same time serving to prevent from classifying foreign matter and/or water droplets (pseudo defects) as surface flaws.

FIG. 1 shows a perspective view of the device 10 according to a first embodiment. The device 10 comprises a first optical line scan camera 14.1 and a second optical line scan camera 14.2, which are each directed at the surface 11 of the object 12. By means of the first line scan camera 14.1, a first line 16 on the surface 11 of the object 12 is read, wherein by means of the second line scan camera 14.2, a second line 18 on the surface 11 of object 12 is read.

The arrow "T" of FIG. 1 symbolizes that the object 12 is moved past the line scan cameras 14.1, 14.2.

When the first line scan camera 14.1 reads the first line 16, a predetermined surface segment 20 of the object 12 is captured. In this regard—taking into account the movement of the object 12 in the transport direction T—it is important for the invention, that when the second line scan camera 14.2 reads the second line 18, the same predetermined surface segment 20 is captured.

The device 10 further comprises a surface inspection means 22. This can be a blower with which air or another gas, preferably under pressure, is directed onto the surface 11 of the object 12 for the purpose of removing water drops or other dirt particles which are temporarily on the surface 11 of the object 12 or deposited thereon. Alternatively, the surface inspection means 22 may be formed by a brush, which comes in contact with the surface 11 of the object 12.

The device 10 comprises an evaluation means 24, which is signally connected to the line scan cameras 14.1, 14.2. In addition, the device 10 also includes a marker M, which is disposed adjacent to the object 12 and is also signally connected to the evaluation means 24. The signaling connections between the evaluation means 24 on the one hand, and the line scan cameras 14.1, 14.2 and the marker M on the other hand are each symbolized by dotted lines in FIG. 1 and can be provided, for example, by physical lines or by radio links or signal paths. Not shown in FIG. 1 is the possibility that the surface inspection means 22, e.g., in the form of a blower, is also signally connected with the evaluation means 24 and thus controlled.

The invention works as follows:

The first line scan camera 14.1 captures the predetermined surface segment 20 of the object 12 at a first point in time by reading the first line 16 on the surface 11 of the object 12. For the method according to the present invention, this corresponds to step (i). Subsequently, i.e., at a second point in time, which is after the first point in time, the predetermined surface segment 20 of the object 12 is again captured by reading the second line 18. For the method according to the present invention, this corresponds to step (iii). The images of the two line scan cameras 14.1, 14.2 are then transmitted to the evaluation means 24 and subsequently evaluated by this evaluation means 24 and compared to one another.

It is important for the invention that the surface 11 of the predetermined surface segment 20 of the object 12 is acted on between the capturing of the images, which are captured at the first point in time (step i) and the second point in time (iii), such that thereby, e.g., water drops or temporary dirt particles that are on the surface 11 of the object 12 or deposited thereon change in terms of their shape and/or position. For the method according to the present invention, this corresponds to step (ii). Such a change occurs, for example, in the case where air under high pressure is directed transversely onto the surface 11 of the object 12 by a blower 22.

In the illustration of FIG. 1, an actual surface flaw which is present in the predetermined surface segment 20 on the surface 11 of the object 12 is labeled with the reference numeral 26 and is indicated as an example in the form of an ellipse. As a result, it is understood that by the action of the surface inspection means 22, when the object 12 is moved past the latter in the transport direction T, this surface flaw 26 neither changes in terms of its shape nor its position on the surface 11 of the object 12, which illustrates the representation of FIG. 1 accordingly. If the evaluation means 24 now determines that in the image capture of step (iii) the surface flaw 26 has changed neither in terms of its shape nor its position in comparison with the image of step (i), thus coinciding with a surface flaw captured in the image of step (i), then this surface flaw 26 is classified as an actual surface flaw of the object 12.

In the classification of an actual surface flaw 26, the marker M can be actuated, for example, by the evaluation means 24 in order to apply a corresponding marking on the surface 11 of the object, which is symbolized by a dot-dash line in the illustration of FIG. 1. In the course of this, it can also be provided for the invention that the object 12 is cut or separated along this marking so that faulty sections of the object 12 can be, e.g., separated out from the manufacturing process.

Figure 2:
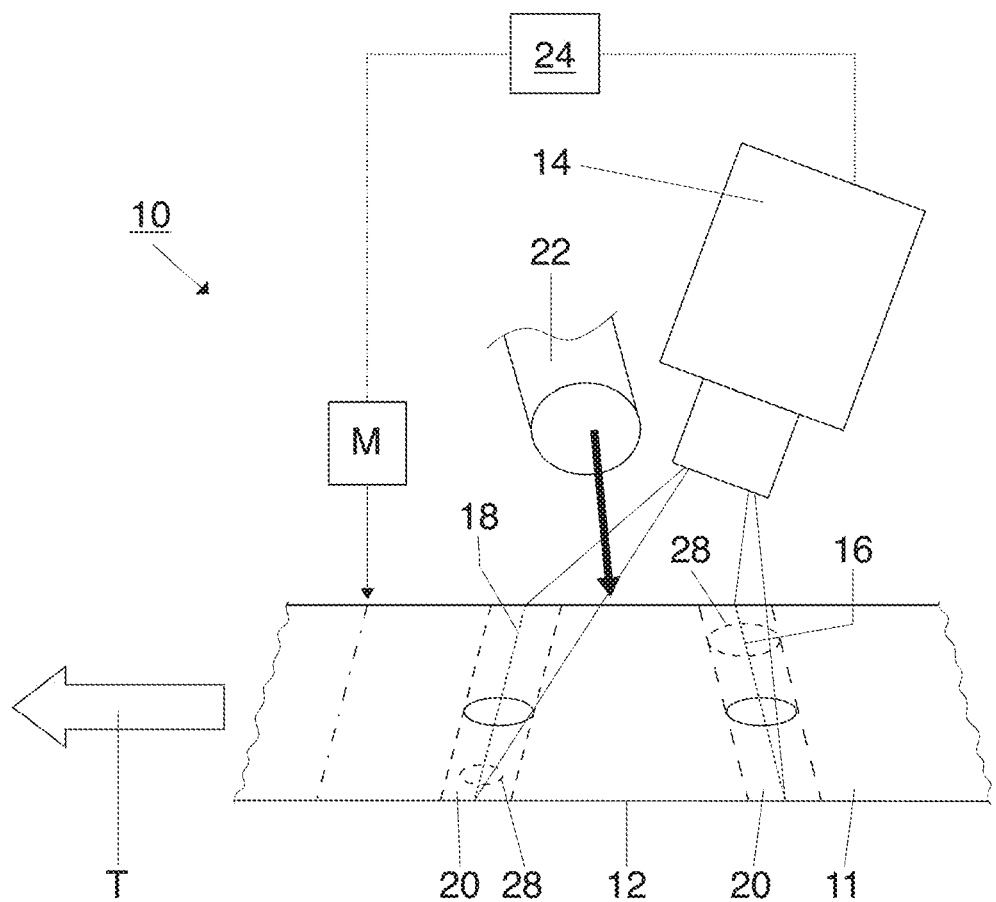
FIG. 2 is a perspective view of a device according to the invention, according to a further embodiment.

FIG. 2 shows a perspective view of the device 10 according to another embodiment. In contrast to the embodiment of FIG. 1, in this case only one optical camera 14 is provided, with which both the first line 16 and the second line 18 can be read on the surface 11 of the object 12.

According to the invention, such a camera 14 is designed as a so-called "hybrid area scan camera" which has already been described above. Incidentally, the manner of operation of the device 10 according to FIG. 2 corresponds to that of FIG. 1, so reference can be made to the above explanations regarding FIG. 1 in order to avoid repetition.

The inspection of possible pseudo defects is described below in reference to FIGS. 3 and 4.

It is possible that a drop of water or other contamination is deposited on the surface 11 of the object 12. Without perceiving this as a limitation, such foreign particles are always referred to as water drops in the following discussion. In the illustrations of FIG. 1 and FIG. 2, such a water.

droplet is designated by the reference numeral 28 and is shown simplified by a dashed ellipse.

Figure 3:
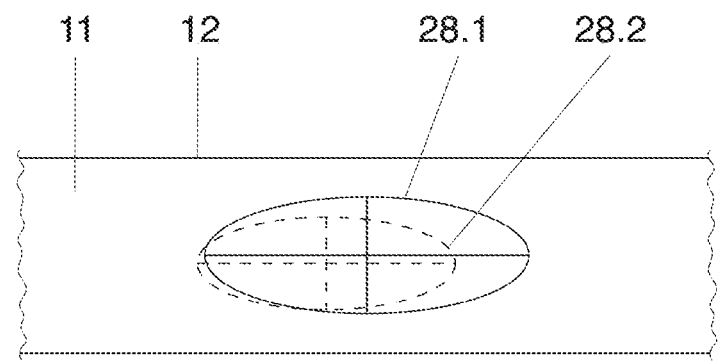
FIG. 3 is a plan view of the surface of an object, which is monitored by a device according to FIG. 1 or FIG. 2, wherein a surface flaw located on the surface of the object changes in terms of shape.
Figure 4:
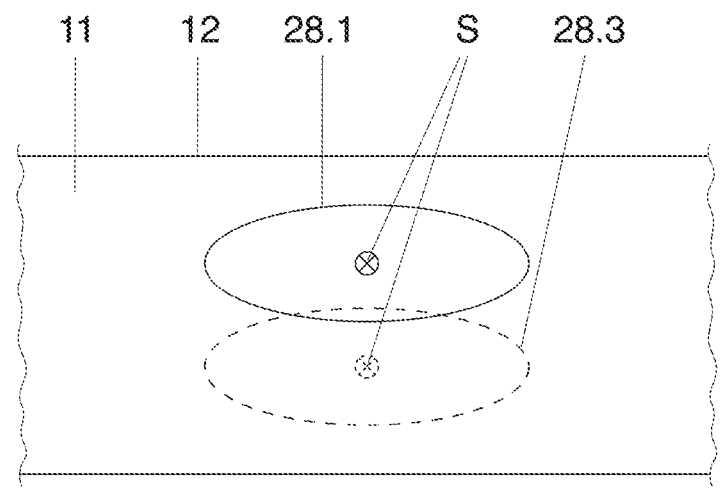
FIG. 4 is a plan view of the surface of an object, which is monitored by a device according to FIG. 1 or FIG. 2, wherein a surface flaw located on the surface of the object is changed in terms of its position on the surface.

FIGS. 3 and 4 each show a plan view of the surface 11 of object 12, wherein the water droplet that is read at the first point in time (step i) in the first line 16, is herein denoted by the reference numeral 28.1.

Subsequent to the image capture of the predetermined surface segment 20 at the first point in time—as explained— the surface 11 of the object is acted on by the surface inspection means 22, for example by the application of air or gas, preferably under pressure. By this action, in correspondence with the above-mentioned step (ii) of the method according to the invention, the water droplet can change in terms of shape. This is illustrated in FIG. 3 by the dashed ellipse 28.2, which is now smaller or has "shrunk" as compared to the ellipse 28.1. If the evaluation means 24 determines that the respective lengths or layers of the half axis of the ellipse 28.2, which in the present case represents a surface flaw or a water droplet during the capture of step (iii), has changed or reduced as compared to the half axis of the ellipse 28.1 by at least 10%, preferably by at least 20%, more preferably by at least 30%, then this water droplet 28 is categorized as a pseudo defect and is filtered out from the signal process.

The representation of FIG. 4 illustrates the change in the water droplet 28, namely with respect to its position on the surface 11 of the object 12. In FIG. 4, as in FIG. 3, the drop of water according to the image capture of step (i) is denoted with the reference numeral 28, wherein the focal point of this water droplet is symbolized by "S". The water droplet after the image capture of step (iii) is indicated by the dashed ellipse, designated by reference numeral 28.3 in FIG. 4, wherein its focal point—as shown—has moved to the lower edge of the object 12. If the evaluation means 24 determines that the position of the focal point of the water droplet 28 has moved by at least 10%, preferably by at least 20%, more preferably by at least 30% of the average size of this water droplet (or in general: of this surface flaw) on the surface 11 of the object 12, then this surface flaw 28 is also categorized as a pseudo defect and is filtered out of the signal process.

For the purpose of detecting pseudo defects, which, as explained, can occur in the form of water droplets on the surface 11 of the object 12, it is understood that the changes, which have been explained above with reference to FIG. 3 and FIG. 4, can also be considered in combination with each other. This means that a pseudo defect is present and can be correspondingly categorized by means of the invention if in the image capture of step (iii), as compared to the image capture of step (i), a change in the water droplet 28 has occurred both in terms of shape and of the position on the surface 11 of the object 12 in the manner explained above, resulting from the action of the surface inspection means 22 between the two image captures or in accordance with the step (ii) per the inventive method. This is illustrated accordingly in FIGS. 1 and 2 for the water droplet 28 in the form of the dashed ellipse.

Finally, it should be pointed out that the abovementioned embodiments of the device according to the invention are of course also suitable for carrying out a method according to the present invention.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. Method for monitoring a surface of an object by means of at least one optical camera, comprising the steps:
   (i) image capture of a predetermined surface segment of the object by a camera at a first point in time,
   (ii) inspection of the predetermined surface segment of the object such that the surface of the object is acted on, and
   (iii) image capture of the predetermined surface segment of the object by a camera at a second point in time, which takes place after the first point in time, wherein the image data of the predetermined surface segment of the images of step (i) and step (iii) is sent to an evaluation means and then evaluated by this evaluation means and compared to each other, wherein if a surface flaw detected in the image capture of step (iii), both in terms of its shape or its position on the surface of the object, coincides with a surface flaw detected in the image capture of step (i), then this surface flaw is classified as an actual surface flaw of the object,
   wherein if a surface flaw detected in the image capture of step (iii) differs in terms of its shape from a surface flaw detected during the image capture of step (i) in such a way that the respective lengths or layers of semi-axes of an ellipse enveloping this surface flaw have changed by at least 10%, preferably by at least 20%, more preferably by at least 30%, then this surface flaw is detected/categorized as a pseudo defect (defect due to liquid or impurities) and is filtered out of the signal process.

2. Method according to claim 1, wherein between the image captures according to steps (i) and (iii), a relative movement between the object and the at least one camera takes place, preferably that the object is moved relative to the camera, more preferably, that the object is translationally displaced relative to the camera, more preferably, that in the image captures of steps (i) and (iii), different spatially spaced and in particular mutually parallel lines or rows are read on the surface of the object, wherein between these lines, the predetermined surface segment of the object is inspected according to step (ii).

3. Method according to claim 1, wherein in step (ii), the surface of the object is acted on in such a way that particles and/or liquid drops in the predetermined surface segment of the surface of the object are changed in terms of their shape and/or position.

4. Method according to claim 3, wherein in step (ii), a blower with which a fluid is applied to the surface of the object, preferably under pressure, or an element touching the surface of the object is preferably applied in the form of a brush for acting on the surface of the object.

5. Method for monitoring a surface of an object by means of at least one optical camera, comprising the steps:
   (i) image capture of a predetermined surface segment of the object by a camera at a first point in time,
   (ii) inspection of the predetermined surface segment of the object such that the surface of the object is acted on, and
   (iii) image capture of the predetermined surface segment of the object by a camera at a second point in time, which takes place after the first point in time,
   wherein the image data of the predetermined surface segment of the images of step (i) and step (iii) is sent to an evaluation means and then evaluated by this evaluation means and compared to each other, wherein if a surface flaw detected in the image capture of step (iii), both in terms of its shape or its position on the surface of the object, coincides with a surface flaw detected in the image capture of step (i), then this surface flaw is classified as an actual surface flaw of the object,
   wherein if a surface flaw detected during the image capture of step (iii) deviates in its position on the surface of the object from a surface flaw detected during the image capture of step (i) in such a way that the focal point of the surface flaw is displaced by at least 10%, preferably by at least 20%, more preferably by at least 30% of the averaged size of this surface flaw on the surface of the object, then this surface flaw is detected/categorized as a pseudo defect (defect due to liquid or impurities) and is filtered out of the signal process.

6. Method according to claim 1, wherein when classifying an actual surface flaw, the surface of the object is marked at the spot where the actual surface flaw is located.

7. Method according to claim 1, wherein for the image captures of step (i) and of step (iii), in each case separate line scan cameras are used, wherein the line scan cameras are spatially spaced from each other, and that preferably, the line scan cameras are aligned relative to the object in a matching orientation.

8. Method according claim 1, wherein for the image captures of step (i) and of step (iii), a single hybrid area scan camera is used, and that preferably, the hybrid area scan camera captures the different lines on the surface of the object in the image captures of steps (i) and (iii).

9. Method according to claim 7, wherein the image captures of step (i) and step (iii) are created without the use of a flash.

10. Method according to claim 1, wherein the optics of the camera(s) are inclined at an angle with respect to an orthogonal directed towards the surface of the object, and that preferably, the optics of the camera(s) is designed in such a way that it fulfills the Scheimpflug condition.

11. Method according to claim 2, wherein the sampling frequency of the camera(s) for the image captures of steps (i) and (iii) is adapted to the speed of the relative movement between the object and the camera(s).

* * * * *